(12) United States Patent
Liu et al.

(10) Patent No.: US 10,540,110 B2
(45) Date of Patent: Jan. 21, 2020

(54) MULTI-CHANNEL DATA STORAGE FOR ACCELERATED SINGLE-CHANNEL READ THROUGHPUT

(71) Applicant: Seagate Technology LLC, Cupertino, CA (US)

(72) Inventors: Xiong Liu, Singapore (SG); Jiangnan Lin, Singapore (SG); WenXiang Xie, Singapore (SG)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 98 days.

(21) Appl. No.: 15/944,235

(22) Filed: Apr. 3, 2018

(65) Prior Publication Data

US 2019/0258402 A1     Aug. 22, 2019

Related U.S. Application Data

(60) Provisional application No. 62/633,970, filed on Feb. 22, 2018.

(51) Int. Cl.
*G06F 12/00* (2006.01)
*G06F 3/06* (2006.01)
*G06F 12/10* (2016.01)

(52) U.S. Cl.
CPC ............ *G06F 3/064* (2013.01); *G06F 3/0613* (2013.01); *G06F 3/0676* (2013.01); *G06F 12/10* (2013.01); *G06F 2212/65* (2013.01)

(58) Field of Classification Search
CPC ...... G06F 3/064; G06F 3/0613; G06F 3/0676; G06F 12/10; G06F 2212/65
See application file for complete search history.

(56) References Cited

U.S. PATENT DOCUMENTS

| | | | | |
|---|---|---|---|---|
| 5,343,347 A | * | 8/1994 | Gilovich | G11B 5/4813 360/246.7 |
| 5,475,540 A | * | 12/1995 | Gold | G05B 19/0421 360/48 |
| 5,587,850 A | * | 12/1996 | Ton-that | G11B 5/3967 360/77.08 |
| 6,298,025 B1 | | 10/2001 | McPherson et al. | |
| 6,507,450 B1 | * | 1/2003 | Elliott | G11B 5/59655 360/77.08 |

(Continued)

*Primary Examiner* — Prasith Thammavong
(74) *Attorney, Agent, or Firm* — Holzer Patel Drennan (57) ABSTRACT

A data-storing method for accelerated read throughput of a channel received as part of a multi-channel data stream includes writing a first channel segment of the multi-channel data stream to a first continuous sequence of physical blocks along a first data track of a storage medium within a storage device and identifying a second channel segment of the multi-channel data stream as being a continuation of the first channel segment. The method further includes writing the second channel segment to a second continuous sequence of physical blocks along a second data track responsive to the identification, the second continuous sequence of physical blocks being offset from the first continuous sequence in a down-track direction by a minimum block offset, the minimum block offset representing at least a number of physical blocks on the storage medium that rotate below a read/write element of the storage device during a time that the read/write element is moved from the first data track to the second data track.

20 Claims, 6 Drawing Sheets

(56) References Cited

U.S. PATENT DOCUMENTS

| | | | | |
|---|---|---|---|---|
| 9,268,651 B1* | 2/2016 | Salyers | ............... | G06F 11/1464 |
| 10,048,865 B2* | 8/2018 | Mehra | ................... | G06F 3/0631 |
| 2018/0364943 A1* | 12/2018 | Ostergaard | ............ | G06F 3/0659 |

* cited by examiner

MULTI-CHANNEL DATA STORAGE FOR ACCELERATED SINGLE-CHANNEL READ THROUGHPUT

PRIORITY CLAIM

The present application claims priority to U.S. Patent Application Ser. No. 62/633,970, filed on Feb. 22, 2018 and titled "Method to Accelerate Read Throughput," which is hereby incorporated by reference in its entirety.

BACKGROUND

In some applications, storage devices receive and store streams of broadcast digital media for subsequent viewing by a user. For example, a digital video recorder (DVR) may be programmed to receive a data stream that includes packets of data for multiple different channels (e.g., TV channels). For fastest recording, the received multi-channel data stream is sometimes written to a magnetic disk according to an order of data receipt, effectively intermixing data of different channels on the same common data tracks. For example, a single data track on a disk may store data for multiple different digital video channels. When data is initially written to disk in this manner and without regard for single-channel read throughput, large delays may be observed during read back of any individual channel due to rotational latencies incurred as a consequence of the data layout on the storage media.

SUMMARY

A method disclosed herein provides for writing a first channel segment of a multi-channel data stream to a first continuous sequence of physical blocks along a first data track of a storage medium within a storage device and identifying a second channel segment of the multi-channel data stream as being a continuation of the first channel segment. The method further comprises writing the second channel segment to a second continuous sequence of physical blocks along a second data track in response to the identification, where the second continuous sequence of physical blocks is offset from the first continuous sequence in a down-track direction by a minimum block offset representing at least a number of physical blocks that rotate below a read/write element of the storage device a during a time that the read/write element is moved from the first data track to the second data track.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

DETAILED DESCRIPTION

Figure 1:
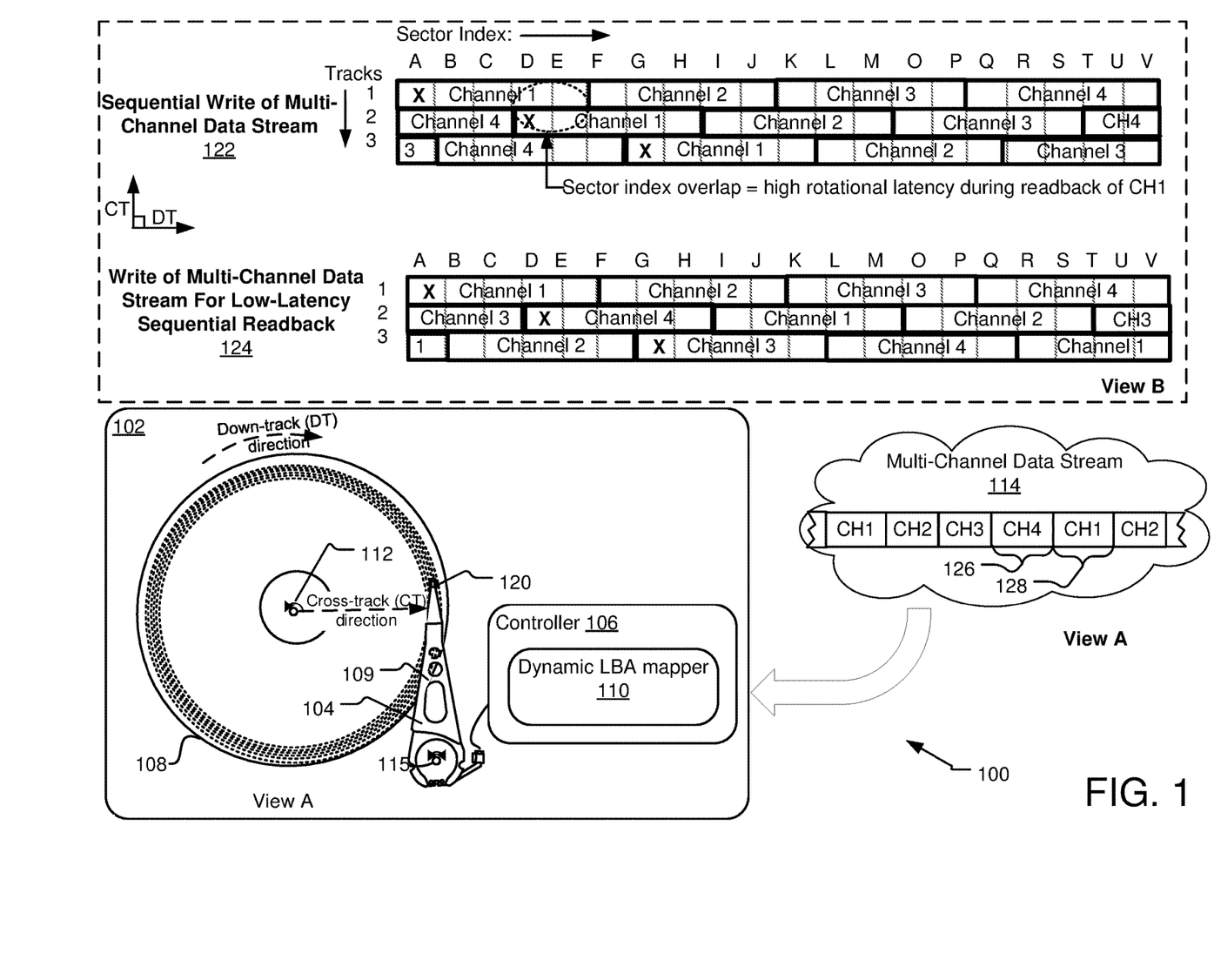
FIG. 1 illustrates an example storage system that records a multi-channel data stream according to a write methodology that increases throughput during read-back of an individual data channel of the multi-channel stream.

FIG. 1 illustrates an example storage system 100 that records a multi-channel data stream 114 according to a write methodology that increases throughput during read-back of an individual data channel of the multi-channel stream. The system 100 includes a storage device 102 including a storage medium 108 and a controller 106. During operation, the storage device 102 receives the multi-channel data stream 114 from a broadcast provider (not shown). The broadcast provider may be, for example, a satellite, cable TV, or other broadcast provider that transmits multiple different channels of digital media in a multi-channel data stream. As used herein, a "channel" refers to an individual stream of digital content (e.g., digital video content) that, when played back according to a defined order (e.g., a sequential order of receipt), facilitates viewing of a continuous segment of one or more digital content items. A digital content item is, for example, a video stream including sound and/or audio, such as a movie, TV show, commercial, etc. The multi-channel data stream 114 includes data of multiple broadcast channels, such as different television channels. For example, the storage device 102 may be included within a digital video recorder (DVR) or set-top box designed to record live broadcasts of multiple channels and/or save on-demand content for subsequent viewing by a user.

Although other implementations are contemplated, the storage medium 108 is, in FIG. 1, a magnetic storage disk on which data bits can be recorded using a magnetic write pole and from which data bits can be read using a magnetoresistive element (not shown). The storage medium 108 rotates about a spindle center or a disc axis of rotation 112 during rotation and includes an inner diameter and an outer diameter between which are a number of concentric data tracks. Information may be written to and read from data bit locations in the data tracks using read/write element(s) on a transducer head assembly 120, which is further mounted on an actuator assembly 104 at an end distal to an actuator axis of rotation 115. The transducer head assembly 120 flies in close proximity to the surface of the storage medium 108 while the storage medium 108 rotates about the axis 112. When reading data from or writing data to various locations on the storage medium 108, the actuator assembly 104 rotates about the actuator axis of rotation 115 to position the transducer head assembly 120 over a target data track.

The controller 106 of the data storage device 100 includes software and/or hardware for implementing data access commands (e.g., read and write commands) to targeted locations on the storage medium 108. The controller 106 manages a mapping of host logical block addresses (LBAs) to physical data blocks on the storage medium 108 and further includes a dynamic LBA mapper 110 that dynamically assigns LBAs to data segments within the multi-channel data stream 114 as the data segments arrive in a volatile memory buffer (not shown) of the storage device 102.

In FIG. 1, the multi-channel data stream 114 includes intermixed channel segments of data from example channels 1, 2, 3, and 4. As times, these channels are annotated herein in an abbreviated form as CH1, CH2, CH3, and CH4, respectively. For purposes of this disclosure, it is assumed that the controller 106 includes a mechanism for identifying which channels the individual data packets within the multi-channel data stream 114 correspond to. It can be appreciated that channel identifiers for the different incoming data packets can be determined in several different ways. In one implementation, the multi-channel data stream 114 includes channel segments that are each of an expected size, such as a size provided by a broadcast agent. For example, the channel segments of the different channels may be identical in size or have different sizes (e.g., CH1 may be received in individual 6-sector segments; CH2 may be received in 5-sector segments, and so forth). In the same or another implementation, the channel segments are received according to an expected order. In the examples illustrated herein, the segments in the multi-channel data stream are arranged according to a repeated sequence (e.g., CH1, CH2, CH3, CH4, CH1, CH2, CH3, CH4, and so on) but may, in other implementations, be received according to a different order. In still other implementations, the data packets within the multi-channel data stream 114 include header information indicating a channel identifier for each data packet.

In the following disclosure, two channel segments are referred to as "continuous channel segments" if the channel segments include data of a same channel and are intended to be read and played consecutively when data is played back from the storage medium 108 (e.g., the data spanning the two channel segments can be played back to view a continuous video segment of a digital content item). Similarly, a channel segment is said to be a "continuation" of another channel segment, such as a previously-received and/or recorded channel segment, if the two channel segments include data of a same channel and/or a same digital content item and are intended to be read and played consecutively. Two channel segments are said to be 'non-contiguous' within the multi-channel data stream 114 when the multi-channel data stream 114 includes one or more intervening channel segments received in a position that is between the two channel segments.

Using one or more techniques including without limitation those described above, the dynamic LBA mapper 110 determines a channel ID in association with each received data packet, thereby identifying discrete "channel segments" within the multi-channel data stream 114 (e.g., channel segments 126, 128). When each channel segment arrives in a data buffer (e.g., a volatile memory region, not shown) of the storage device 102, the dynamic LBA mapper 110 dynamically assign an LBA range to each channel segment. For example, the dynamic LBA mapper 110 creates and populates a logfile (not shown) of LBA information sufficient to facilitate a sequential single-channel read-back of each channel included within the multi-channel data stream 114. In one implementation, the dynamic LBA mapper 110 logs a start and/or stop LBA for each channel segment. In other implementations, the dynamic LBA mapper 110 records other information (e.g., offset and/or calculation metrics) usable to determine where each channel segment starts and stops within each individual data track.

View B of FIG. 1 illustrates two different example mappings (122, 124) of the dynamic LBA mapper 110. Each of the mappings 122, 124 represent a mapping of data of the multi-channel stream 114 to a grouping of consecutive data tracks (e.g., tracks 1-3) on the storage medium 108 according to different write methodologies. In these exemplary mappings, the horizontal letters A-V represent data sectors on the storage medium, where each individual data sector corresponds to a different LBA that may be used by a host device when reading and writing data to the storage media 108.

In the examples shown throughout this disclosure, alphabetical letters (e.g., A-V in FIG. 1 or A-Z in FIG. 2-3) are used to represent sector indices. Sector indices are physical block indices, which are different than LBAs. In one implementation, LBAs are mapped to sector indices on the storage medium 108 such that the LBAs are consecutive and continuous along the sequential sector indices of each data track and such that the LBAs span across adjacent tracks to enable a multi-track reading of a consecutive LBA sequence. In FIG. 1, the logical block addresses do not mirror the exact illustrated sequential order of the sector indices A-V. For example, in FIG. 1, an "X" within each track 1-3 denotes a "start LBA" (e.g., lowest-numbered LBA) of each track. The start LBA of each track is offset from the start LBA of the prior track by a predetermined offset, which is shown to be three data sectors. Thus, in the illustrated example, the LBA sequence maps across tracks 1-3 in a consecutive increasing order along the following sector indices: track 1, A-V, followed by track 2 sectors D-C, followed by track 3 sectors G-F, etc. As a result of this mapping, tracks 1, 2, and 3 can be written in a sequential LBA order without radial movement of the transducer head assembly 120 except to enable natural switches between adjacent tracks. Here, the offset between the start LBA of each track provides a time in which the transducer head assembly 120 may switch positions between adjacent tracks to facilitate the continued reading of the consecutive LBA sequence without "missing" any data sectors of the sequence that rotate past while the transducer head assembly 120 is repositioned.

Referring again to View B, a first mapping 122 illustrates a mapping methodology in which data of the multi-channel stream 114 is mapped to sequential LBAs and corresponding physical blocks according to a strict order of receipt at the storage device 102. Here, the data segments of the multi-channel data stream 114 are assigned sequential LBAs according to an order they are received. The sectors A-V of track 1 are filled sequentially by a first sequentially-received portion of the multi-channel data stream 114; the sectors A-V of Track 2 are filled sequentially next by a second sequentially-received portion of the multi-channel data stream 114; and the sectors A-V of Track 3 are filled next by a third sequentially-received portion of the multi-channel data stream 114.

The mapping 122 results in several "overlap" regions where two directly adjacent data tracks store continuous channel segments in identical sector indices. For example, FIG. 1 includes an annotation indicating a "sector index overlap" in sectors D and E where CH1 data is stored in both tracks 1 and 2. As a result of these sector index overlap regions between continuous channel segments in the mapping 122, the storage device 102 experiences delay when reading back data of an individual channel from the storage medium 108. For example, reading data of channel 1 according to the mapping 122 entails reading sectors A-E of track 1 and then moving (seeking) the transducer head assembly 120 to position itself to read data from the continuation channel segment on track 2. During this seek between tracks 1 and 2, the storage medium 108 rotates under the transducer head by a number of sectors. For example, the transducer head 120 begins to seek to track 2 after finishing reading sector E of track 1; however, the storage medium 108 rotates during this seek such that the transducer head 120 arrives at track 2 in position above another subsequent sector, such as G or H, after the targeted channel 1 segment has already rotated past. In this scenario, the transducer head assembly 120 then has to "wait" for nearly a full rotation of the storage medium 108 for sector D (the first sector of channel 1 on track 2) to rotate under the transducer head assembly 120. This type of delay is referred to herein as a "rotational latency."

Although the sector index overlap of the continuous channel segments on tracks 1 and 2 illustrates one mapping scenario that causes high rotational latencies, it is worth noting that high rotational latencies are also observed in some implementations even when there is no sector index overlap between continuous channel segments. Specifically, these large rotational latencies may be incurred whenever the separation between contiguous channel segments is less than the radial track distance that rotates past the transducer head assembly 120 during a seek between the continuous channel segments.

The rotational latency incurred when reading back continuous segments of channel 1 is further amplified when the transducer head assembly 120 finishes reading sectors D-H of channel 1 data on track 2 and then again seeks to track 3 to position itself at sector G for a reading of the next continuation segment of channel 1. In this case, the transducer head assembly 120 again arrives late, just after sector 'J' has rotated past, and the transducer head assembly 120 again waits for nearly a full rotation of the storage medium 108 for the target sectors G-K to rotate under the read/write element at its position along track 3.

In contrast to the purely-sequential write of multi-channel data described with respect to the first mapping 122, a second mapping 124 illustrates another technique for mapping and writing the multi-channel data. This technique facilitates higher throughput (e.g., and lower rotational latency) when reading data of a single channel back from the storage medium. According to the mapping 124, continuous segments of channel data are spaced out from one another along directly adjacent tracks by at least a defined minimum offset such that continuous channel segments on directly adjacent tracks are not stored in any common sector indices. For example, the channel 1 segment in sectors A-E of track 1 does not "overlap" the channel 1 segment in sectors I-M of track 2 since E and I are separated from one another by three intervening sectors (F, G, and H).

According to one implementation, the dynamic LBA mapper 110 creates the mapping 124 by enforcing a minimum sector offset (also referred to herein as a "minimum block offset") between continuous channel segments on different data tracks. When the dynamic LBA mapper 110 identifies an incoming channel segment as being a continuation of an earlier-written channel segment, the dynamic LBA mapper 110 maps the continuation segment to a sector index range that is offset from a sector index range of the earlier written channel segment by a predefined minimum sector offset. In one implementation, this predefined minimum sector offset represents a number of physical data blocks (e.g., sectors) that rotate below a read/write element of the transducer head assembly 120 during a time that the read/write element is moved from a position along a first track storing the earlier-written segment to a second track storing the continuation segment. For example, the minimum sector offset may represent the number of sectors between the start LBA index (denoted with an "X") on adjacent data tracks. Notably, the minimum sector offset depends on the speed of rotation of the storage medium 108 as well as the speed of movement of the actuator arm 109. Enforcing this minimum sector offset for each pair of continuous channel segments mitigates and/or minimizes the rotational latencies incurred when the storage device 102 reads back data of any individual single channel from the storage medium 108.

Both the storage device controller 106 and the dynamic LBA mapper 110 include software, or a combination of hardware and software, with the software in the form of computer-executable instructions encoded in memory. For purposes of this description and meaning of the claims, the term "memory" means a tangible data storage device, including non-volatile memories (such as flash memory, magnetic disk storage, other magnetic storage devices and the like) and volatile memories (such as dynamic random access memory and the like). The computer-executable instructions either permanently or temporarily reside in the memory, along with other information such as data, virtual mappings, operating systems, applications, and the like that are accessed by a computer processor to perform the desired functionality. The term "memory" expressly does not include a transitory medium such as a carrier signal, but the computer instructions can be transferred to the memory wirelessly Data storage and/or memory may be embodied by various types of storage, such as hard disc media, a storage array containing multiple storage devices, optical media, solid-state drive technology, ROM, RAM, and other technology. The operations may be implemented in firmware, software, hard-wired circuitry, gate array technology and other technologies, whether executed or assisted by a microprocessor, a microprocessor core, a microcontroller, special purpose circuitry, or other processing technologies.

Figure 2A:
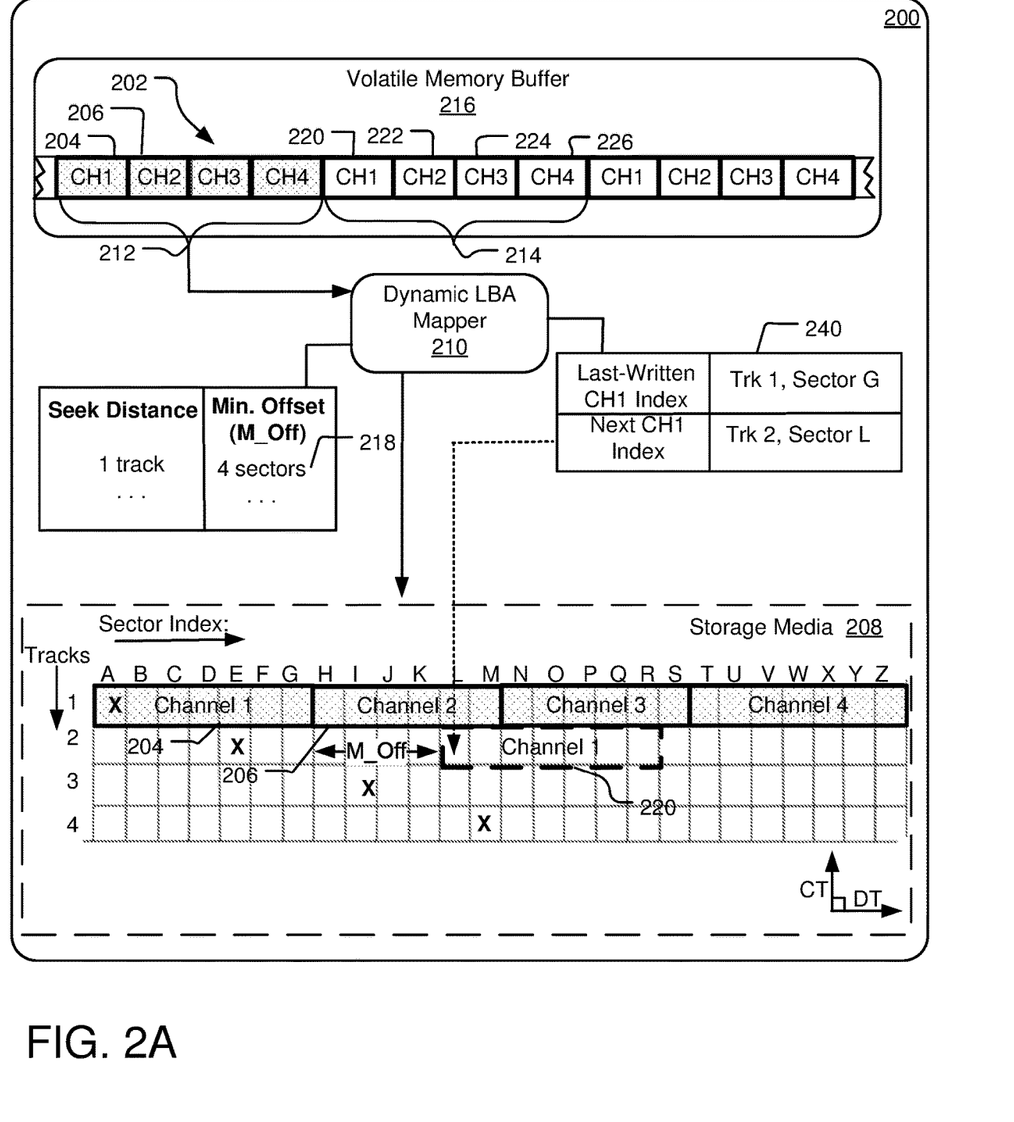
FIG. 2A illustrates first data-storing operation by an example storage device that facilitates accelerated read throughput of single-channel data received as part of a multi-channel stream.

FIG. 2A illustrates first data-storing operation by an example storage device 200 that facilitates accelerated read throughput of single-channel data received as part of a multi-channel stream 202. As the data of the multi-channel data stream 202 arrives at the storage device 200, data of the stream placed into a volatile memory buffer 216 (e.g., DRAM). A dynamic LBA mapper 210 of the storage device 200 analyzes the channel data within the volatile memory buffer and identifies different channel segments (e.g., channel segments 204, 206, 220, 222, 224, 226, etc.) within the multi-channel data stream 202. As discussed above with respect to FIG. 1, the identification of different channel segments may be performed in a number of suitable ways depending on implementation design choice and data formatting selections of a broadcast agent that transmits the multi-channel data stream 202 to the storage device 200.

As the dynamic LBA mapper 210 identifies each discrete channel segment (e.g., a collection of data packets belonging to a same data channel) within the multi-channel data stream 202, the LBA mapper 210 assigns the discrete channel segments logical block addresses (LBAs) on a storage medium 208. In the illustrated example, the letters A-Z on the storage medium 208 represent exemplary consecutive LBAs and it is assumed that a continuous, consecutive LBA sequence spans tracks 1, 2, 3, and 4, in order, when a start LBA (e.g., a lowest-numbered LBA of each track) is written to the sector index denoted with an "X" and the track is filled from this index in the down-track (DT) direction with an LBA-consecutive sequence. In other implementations, LBAs may be mapped to the storage medium 208 differently than that shown and/or LBAs may be dynamically assigned to physical block locations at the time that data is received and written to the storage medium 208.

The dynamic LBA mapper 210 directs the channel segments to sequentially fill a first data track (Track 1) according to an order in which the same channel segments are received in the multi-channel data stream 202. In the illustrated example, there are four different channels CH1, CH2, CH3, and CH4 in the multi-channel data stream 202, and the channel segments are sized so that a first sequential portion 212 of the mixed channel data stream 202 fills the entire first data track. In other implementations, sequential groupings of channel segments may not be perfectly-sized to fill a data track and data of a single channel segment may therefore be stored separately on two or more different data tracks.

After filling the first data track (Track 1) with the first sequential portion 212 of the multi-channel data stream 202, the dynamic LBA mapper 210 executes logic to determine which LBAs to assign to the various channel segments 220, 222, 224, and 226 of a next consecutive portion 214 of the multi-channel data stream 202. There are several logical decisions that affect this mapping. First, the dynamic LBA mapper 210 identifies a first channel segment in the next consecutive portion 214 of the stream that is a continuation of another previously-recorded channel segment. In the illustrated example, the dynamic LBA mapper 210 first identifies a channel segment 220 as being a continuation of previously-written channel segment 204. Responsive to this determination, the dynamic LBA mapper 210 performs operations to determine where on the storage medium 208 to place the channel segment 220.

In general, the starting sector index of each continuation segment on the storage medium 208 is offset from an end sector index of the last-written segment of the same channel by a minimum sector offset 218 (e.g., "M_Off" in FIG. 2). The minimum sector offset 218 is shown have a size of four data sectors in the illustrated example; however, this distance varies in different implementations based on storage device parameters as well as the relative radial separations between the two data tracks storing the different portions of the continuous channel segments 204, 220.

The minimum sector offset 218 is based on a seek time between a target data track (e.g., a track that is to store the continuation channel segment) and an already-written data track storing a first portion of the two continuation channel segments. In general, this minimum sector offset may be given by the equation 1, below, where 'seekTime' represents the time in seconds for seeking the read/write element between the two tracks:

$$\text{Minimum Sector Offset} = seekTime * \left(\text{speed of media rotation}\left(\frac{\text{sectors}}{\text{second}}\right)\right) \quad (1)$$

Stated differently, the minimum sector offset 218 represents a number of sectors that rotate below a read/write element of the storage device 200 while the read/write element is moved between two tracks storing continuous channel segments. In the illustrated example where the minimum sector offset 218 is four sectors, the relevant seek time (seekTime) is a time for an actuator arm of the storage device 200 to reposition itself from track 1 to track 2.

In the illustrated example, the channel segment 204 fills sector G of track 1 but not sector H. The determined minimum sector offset 218 is four sectors. Consequently, the dynamic LBA mapper 210 determines that the continuation segment 220 is to have a start sector index of L in track 2, which is offset by G by four sectors. In this example, the continuation channel segment 220 is assigned an LBA corresponding to a start sector index that is offset from the start sector index of the channel segment 204 by exactly the minimum sector offset. In other cases, the implemented offsets between continuous channel segments may be more than the minimum sector offset.

In the illustrated example, the read/write element of the storage device 200 can begin reading the continuation segment 220 as soon as the storage device has finished moving the actuator arm to position the read/write element from track 1 to track 2 (e.g., because the seek time is four sectors and the read/write element arrives at track 2 ready to read data just as the target sector index L rotates under the read/write element. This mapping of the channel segments 204 and 220 permits the two continuous channel segments to be read sequentially without experiencing rotational latency of the storage medium 208 following the read of the first continuous segment 204 and prior to the reading of the continuation segment 220.

Figure 2B:
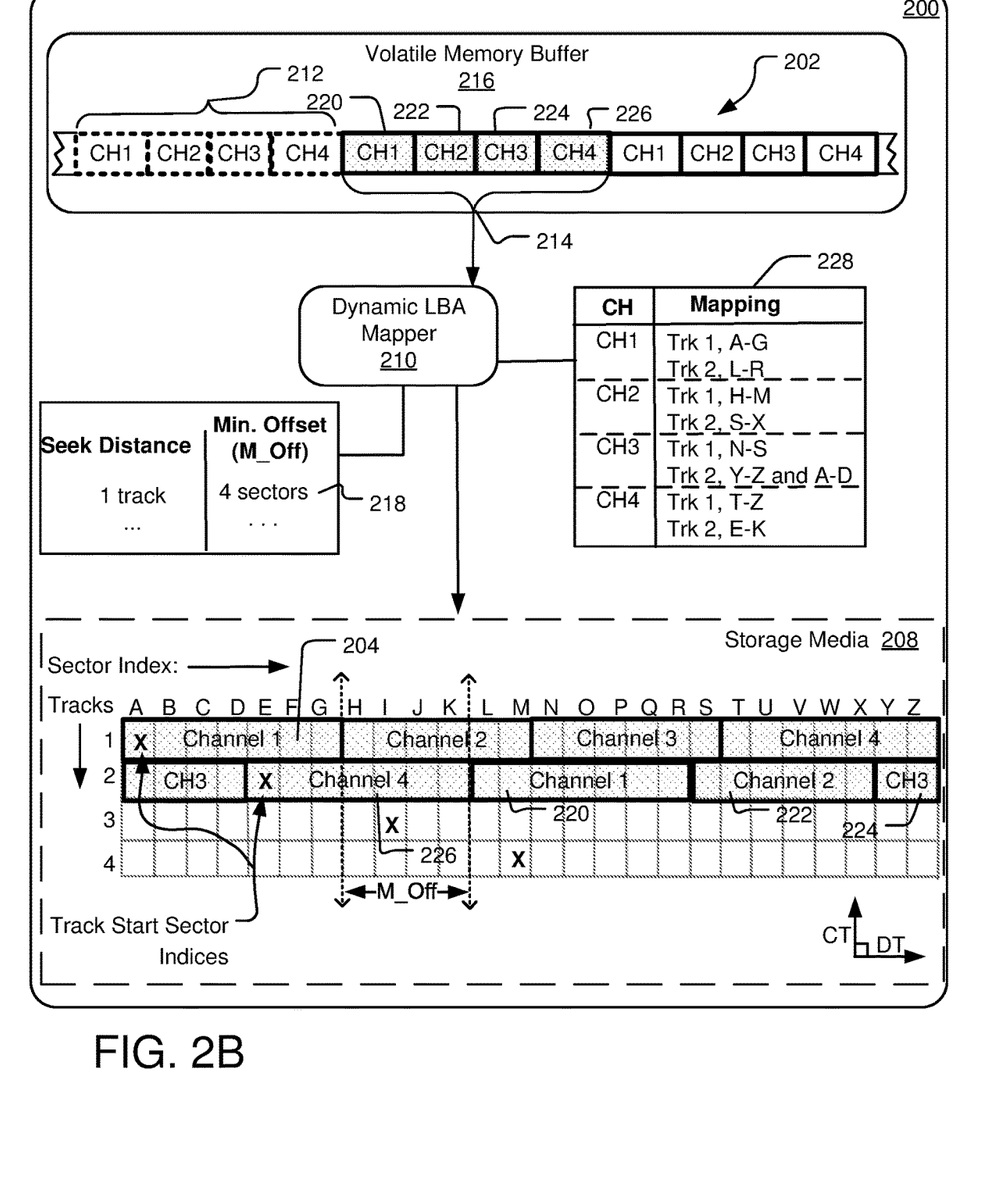
FIG. 2B illustrates another data-storing operation of the storage device shown in FIG. 2A.
Figure 2C:
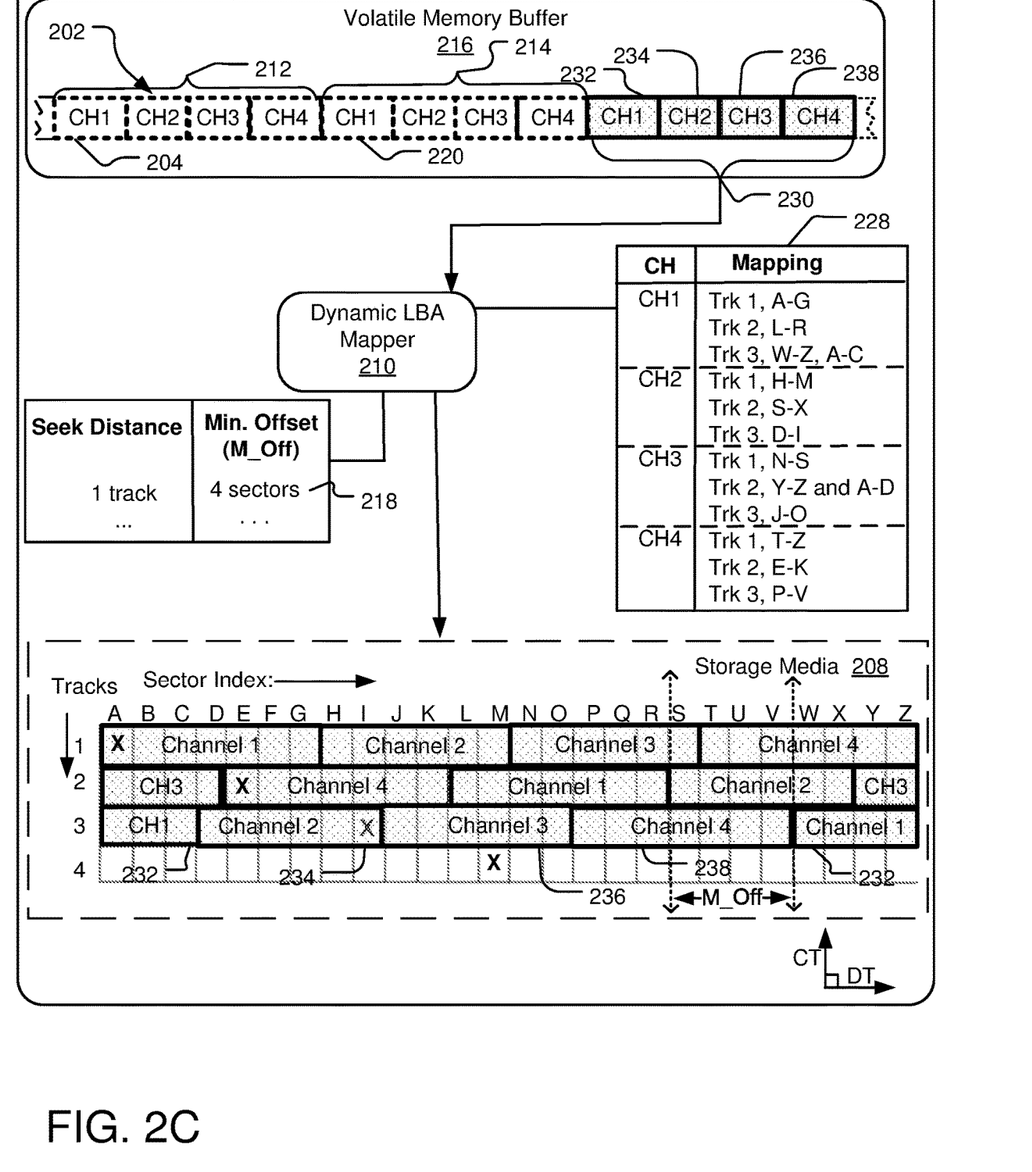
FIG. 2C illustrates yet another data-storing operation of the storage device shown in FIGS. 2A and 2B.

In the examples and described with respect to FIG. 2A-2C, the portions 212, 214, 216 of the multi-channel data stream 202 are each sized to exactly map to one track. However, in other implementations, the channel segment sizing may differ and consequently, the separation between continuous channel segments may be greater than one track. In these circumstances when the separation between continuous channel segments is greater than one track, the track sector offset (M_Off) is also larger than the illustrated track sector offset 218, which is for a single-track seek. As explained above, the track sector offset (M_Off) is determined based on the seek time between two tracks storing continuous channel segments. Thus, if the seek is multi-track seek (e.g., 3 tracks), M_Off is larger than in the illustrated instance of a single track seek. The larger the seek, the larger this offset may be.

Notably, FIG. 2A includes exemplary index information 240 that may result when the dynamic LBA mapper 210 executes the above-described logic. In different implementations, this information may or may not be stored or specifically known to the dynamic LBA mapper 210.

FIG. 2B illustrates another data-storing operation by the example storage device 200 following the example data-storing operation illustrated in FIG. 2A. In FIG. 2B, the multi-channel data stream 202 has been written to a track ("track 1") of the storage medium 208 and according to a sequential order that the data was received within the volatile memory buffer 216. In preparing to write the next sequential portion 214 of the multi-channel data stream 202 to track 2 of the storage medium 208, the dynamic LBA mapper 210 identifies the channel segment 220 as being a continuation of the channel segment 204 (previously written to sectors A-G of track 1). Responsive to this determination, the dynamic LBA mapper 210 determines a start sector index "L" for the segment 220 on track 2, which is offset from the end sector index (e.g., G) of the corresponding channel segment 204 by the determined minimum sector offset 218 (e.g., four sectors).

After identifying the start sector index (L) of the first channel segment that is a continuation segment and to be written to track 2 (e.g., the channel segment 220), the dynamic LBA mapper 210 maps the channel segments 220, 222, 224, and 226 to track 2 starting at the sector index L and mapping sequentially in a down-track direction and according to the sequential order of receipt within the volatile memory buffer 216. As a result of this mapping, the channel segment 220 (CH1) is mapped to sectors L-R; the channel segment 222 (CH2) is mapped to sectors S-X; the channel segment 224 (CH3) is mapped to sectors Y, Z, A, B, C, D (where Z and A are directly adjacent sectors along track 2 with consecutive LBAs); and the channel segment 226 (CH4) is mapped to sectors E-K.

The dynamic LBA mapper 210 updates a logfile 228 on an ongoing basis while dynamically mapping each channel segment to a corresponding LBA range of the storage medium 208. Although the logfile 228 may include different information in different implementations, the information stored in the logfile 228 is sufficient to allow the storage device 202 to sequentially read-back any single individual channel (e.g., CH1, CH2, CH3, or CH4) with in the multi-channel data stream 202. In one implementation, the logfile 228 stores a start LBA (e.g., the lowest-numbered LBA) for each LBA-consecutive portion of the multi-channel data stream 202, a starting LBA for each LBA-consecutive portion, and a length of each LBA consecutive portion. In the event that a consecutive portion of the multi-channel data stream 202 is mapped sequentially to consecutive LBAs that span an entire track, as in track 1 of the illustrated example, the logfile 228 may store less information than in cases where one or more channel segments spans non-consecutive LBA segments, as in track 2 of the illustrated example. In the instance of track 1, for example, the logfile 228 may store a note indicating the following: (1) the track start LBA corresponds to sector index A; (2) channel 1 has a starting LBA that corresponds to sector A; and (3) the length of the portion 212 (including the first four channel segments) is 26 sectors (or LBAs).

In other cases, however, one of the channel segments may span a non-consecutive LBA range (e.g., when the track start sector denoted with an "X" does not correspond to a first sector of a channel segment). In this case, the logfile 228 may store additional information, such as a separate note corresponding to each different LBA-consecutive portion within the portion 214 of the multi-channel data stream 202. The storage device 200 accesses this information in the logfile 228 to read back data of each individual channel.

To actually implement the track 2 mappings illustrated in the logfile 228, a controller (not shown) of the storage device 202 positions a read/write element over a "track start sector index" (e.g., the lowest-numbered LBA sector for each track, annotated with an X) in sector E of track 2. This track start sector index (E) is offset from a track start sector index in track 1 (also annotated with an X) by the minimum sector offset of four sectors. Beginning at this track start sector index (E) on track 2, the controller writes the data of the following segments sequentially and in the following order to track 2: the segment 226 (CH4) is written to sectors E-K, the segment 220 (CH1) is written to sectors L-R; the segment 222 (CH2) is written to sectors S-X; the segment 224 (CH3) is written to sectors Y-Z and A-D. As a result of this mapping and data-storing scheme, read throughput is accelerated when reading back data from any one of the channels within the multi-channel data stream (CH1, CH2, CH3, or CH4) due to an observed decrease in rotational latency observed.

FIG. 2C illustrates another data-storing operation by the example storage device 200 following the example data-storing operations illustrated in FIG. 2A and FIG. 2B. In FIG. 2C, the first sequential portion 212 of the multi-channel data stream 202 has been written sequentially to a first track ("track 1") of the storage medium 208. The second sequential portion 214 of the multi-channel data stream 202 has been written sequentially to an adjacent track ("track 2").

In preparing to copy a next sequential portion 230 of the multi-channel data stream 202 from the volatile memory buffer 216 to track 3 of the storage medium 208, the dynamic LBA mapper 210 identifies a channel segment 232 as being a continuation of the channel segment 220, where the channel segments 204, 220, and 232 represent continuous channel segments of channel 1.

Responsive to this identification of the channel segment 232 as being a continuation of the previously-written channel segment 220, the dynamic LBA mapper 210 performs operations to determine where on the storage medium 208 to place the channel segment 232. The dynamic LBA mapper 210 references the logfile 228 to identify an LBA corresponding to an end sector index of the last-written segment of the same channel. The logfile 228 indicates that CH1 segments have been written to sectors A-G of track 1 and sectors L-R of track 2. Here, sector R is the last written sector index of CH1. Since the determined minimum sector offset for a single-track seek (from track 2 to track 3) is 4 sectors, the dynamic LBA mapper 210 selects sector W on track 3 as a start sector index for the continuation segment 232 (e.g., W is offset from R by four sectors).

After identifying the start sector index (W) of the channel segment 232, the dynamic LBA mapper 210 maps the channel segments 232, 234, 236, and 236 to LBAs of track 3, starting at the LBA corresponding to the sector index W and mapping to sequential blocks in a down-track direction and according to the sequential order of receipt within the volatile memory buffer 216. As a result of this mapping, the channel segment 232 (CH1) is mapped to sectors W-Z and A-C (where Z and A are directly adjacent sectors); the channel segment 234 (CH2) is mapped to sectors D-I; the channel segment 236 (CH3) is mapped to sectors J-O; and the channel segment 236 is mapped to sectors P-V.

The dynamic LBA mapper 210 updates the logfile 228 to reflect the mappings of each of the channel segments 232, 242, 236, and 238 to track 3. In this example, the segment 234 (CH2) corresponds to a non-consecutive LBA range since the track start sector index (the lowest-numbered LBA) is sector I and the segment 234 spans sectors D-I. In one implementation, the dynamic LBA mapper 210 updates the logfile 228 to store a note corresponding to each different LBA-consecutive portion within the portion 230 of the multi-channel data stream 202. For example, a first note in the logfile 228 may indicate that the track 3 start LBA corresponds to sector index I; a starting LBA for writing channel 1 corresponds to sector W; and that first LBA-consecutive portion of the sequence has a length of 12 (sectors W-Z and A-H). Here, a second note in the logfile 228 may indicate that the track 3 start LBA corresponds to sector index I, that a starting LBA for writing a second part of the sequence correspond to sector I, and that a second LBA-consecutive portion of the sequence has a length of 14 sectors (sectors I-V).

After updating the logfile 228, the dynamic LBA mapper 210 begins writing the corresponding data to track 3. When writing to track 3, the controller of the storage device 202 positions a read/write element over a "track start sector index" (annotated with an X) in sector I of track 3. This track start sector index (I) is offset from a track start sector index (E) in track 2 by the minimum sector offset of four sectors. Beginning at this track start sector index (I), the controller writes the data of the following segments sequentially and in the following order to track 2: first, a latter portion of the channel segment 234 (CH2) is written to sector I; next, the channel segment 236 (CH3) is written to sectors J-O; then, the channel segment 238 (CH4) is written to sectors P-V; the channel segment 232 (CH1) is written to sectors W-Z and A-C; and a beginning portion of the channel segment 234 is written to sectors D-H.

As a result of this mapping and data-storing scheme, read throughput is accelerated due to an observed decrease in rotational latency observed when reading back data from any one of the channels within the multi-channel data stream (CH1, CH2, CH3, or CH4).

Figure 3:
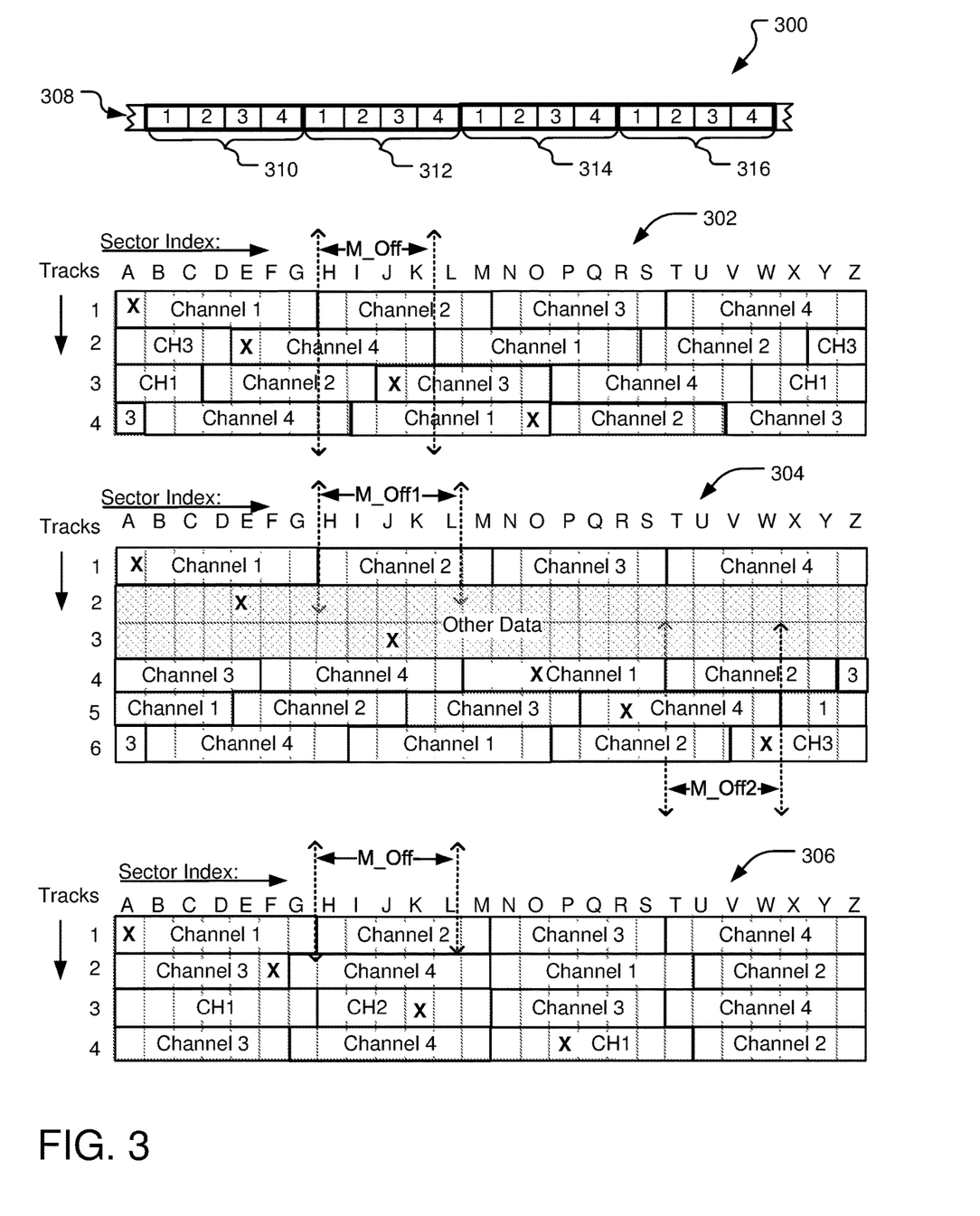
FIG. 3 illustrates example mapping schemes of a system that provides accelerated read throughput of single-channel data received as part of a multi-channel data stream.

FIG. 3 illustrates example mapping schemes 302, 304 and 306 of a system 300 that provides accelerated read throughput of single-channel data received as part of a multi-channel stream 308. Each of the mapping schemes 302, 304, and 306 represents an exemplary mapping of channel segments from a multi-channel data stream 308. In the example shown, the multi-channel data stream 308 includes four portions 310, 312, 314, and 316 of equal length that each include channel segments for channels 1, 2, 3, and 4.

In each one of the example mapping schemes 302, 304, and 306, the different portions 310, 312, 314, and 316 of the multi-channel data stream 308 are mapped to independent data tracks of a disk. Specific characteristics of the system 300 not described below may be the same or similar to those generally described above with respect to FIG. 1 through FIG. 2C.

The system 300 includes a dynamic LBA mapper (not shown) that sequentially maps the portions 310, 312, 314, and 316 of the multi-channel data stream 308 to fill tracks on the disk according to a consecutive track order and sequentially according to an increasing, consecutive LBA sequence. In FIG. 3, a start LBA (lowest-number LBA) on each data track is denoted with an "X."

In each of the three illustrated mapping schemes 302, 304, and 306, portion 310 is mapped and written to track 1 according to an order that the corresponding data is received within the multi-channel data stream 308. When preparing to write a next portion, the portion 312, to a next available target data track, the dynamic LBA mapper identifies a first channel segment within the portion 312 that is a continuation of a previously-written channel segment. In the illustrated example, a first channel segment of the portion 312 includes channel 1 data. The dynamic LBA mapper recognizes this channel segment as being a continuation segment of the channel 1 segment already mapped and written to sectors A-G of track 1.

Responsive to this identification of a first continuation channel segment appearing within the multi-channel data stream 308, the LBA mapper identifies the corresponding channel (e.g., channel 1) as being a "benchmark" channel segment. When mapping the various channel segments to any individual data track, the benchmark channel segment is routinely mapped first, prior to the mapping of the other channel segments. That is, to map data of any one of the portions 312, 314, and 316 to a target data track, the LBA mapper first determines the LBA mapping for the benchmark channel segment (e.g., the channel 1 segment) and then maps the remaining channel segments (2, 3, 4) according to the sequential order of receipt and in the down-track direction along sequential physical sectors of the target data track following the benchmark channel segment. Example ways of implementing these mappings are discussed below with respect to the mapping schemes 302, 304, and 306.

In the mapping scheme 302, each pair of continuous channel segments is separated exactly by a calculated minimum sector offset, where the calculated minimum sector offset is given by Eqn. 1, above. In the mapping scheme 302, the portion 310 of the multi-channel data stream 308 is mapped to track 1; the portion 312 is mapped to track 2, the portion 314 is mapped to track 3, and the portion 316 is mapped to track 4. The tracks are filled consecutively (e.g., in the order track 1, track 2, track 3, track 4), where the write of each individual track starts with the sector denoted with an "X", and "channel 1" is (as described above) identified as the benchmark channel segment.

To write track 2, the LBA mapper determines the minimum sector offset corresponding to the single-track seek from track 1 to track 2. In this example, the minimum sector offset ("M_Off") is 4 sectors. (Note: the same minimum sector offset is used when writing data to tracks 3 and 4 in this mapping scheme). The channel 1 segment of track 2 is mapped to an LBA range that is offset from the channel 1 segment of track 1 by exactly the minimum sector offset. The other channel segments (e.g., 2, 3, 4) of the portion 312 are mapped to the disk sequentially according to an order of data receipt and also sequentially along the physical sectors of track 2 in the down-track direction, starting with the first available sector index after the mapped benchmark segment. After this mapping for track 2 is completed and logged in a logfile (not shown), the portion 312 is written to track 2 sequentially, beginning at a track track start sector index 'E' (denoted with the letter X in FIG. 1). This track start sector index for track 2 is offset from a track start sector index 'A' of track 1 by the minimum sector offset of 4 sectors corresponding to a single-track seek.

Following the mappings of data to tracks 1 and 2 within the mapping scheme 302, data of the multi-channel data stream 308 is sequentially mapped to tracks 3 and 4 in a similar manner. Because the benchmark segment (the channel 1 segment) written to each of these tracks is a continuation of a channel segment on the directly adjacent track (e.g., a single-track seek), the same minimum sector offset of four sectors is assumed and used as offset between corresponding benchmark segments on adjacent tracks. Consequently, the channel 1 segment on track 1 is offset by four sectors from the channel 1 segment of track 2; the channel 1 segment on track 2 is offset by four sectors from the channel 1 segment of track 3; and the channel 1 segment on track 3 is offset by four sectors from the channel 1 segment on track 4. The physical sectors of tracks 3 and 4 are sequentially filled with the corresponding mapped data, starting with track start sector indices denoted by the letter "X" in each track. Each track start sector index (X) is offset from the track start sector index of the previous track by the minimum sector offset corresponding to a single-track seek.

In contrast with the mapping scheme 302, the mapping scheme 304 illustrates an example where the various pairs of continuous channel segments are separated by different numbers of intervening tracks at different radial locations on the disk. In this example, track 1 is filled by data of the portion 310 of the multi-channel data stream 308 as described above. For various reasons, other data (e.g., metadata) is written to tracks 2 and 3. The LBA mapper than maps the portions 312, 314, and 316 of the multi-channel data stream 308 to tracks 4, 5, and 6, respectively. When mapping the portion 312 to track 4, the LBA mapper determines a first minimum sector offset (M_Off1) of 5 sectors, which corresponds to a seek time between tracks 1 and 4. The channel 1 segment of track 4 is mapped to an LBA range that is offset from the channel 1 segment of track 1 by 5 sectors. When writing the portion 314 to track 5, the LBA mapper determines a second different minimum sector offset (M_Off2) of 4 sectors, which corresponds to a seek time between tracks 4 and 5. The channel 1 segment of track 5 is mapped to an LBA range that is offset from the channel 1 segment of track 1 by 4 sectors. Likewise, the same single-track offset (M_Off2) is used to map the channel 1 segment of the portion 316 to track 6. The remaining segments of each of the tracks 4-6 are mapped sequentially along the sequential physical sectors that follow the channel 1 segment along the circumference of the track, as described above.

When data is written each one of tracks 4-6, each track write begins at a write sector start index denoted by the letter "X" on each track. Each track start sector index X is offset from the track start sector index of the previous track by the minimum sector offset corresponding to a single-track seek.

The mapping 306 illustrates an example where each pair of continuous channel segments is separated by a number of sectors that exceeds a determined minimum sector offset (M_Off). In the mapping 304, the portion 310 of the multi-channel data stream 308 is mapped to track 1; the portion 312 is mapped to track 2, the portion 314 is mapped to track 3, and the portion 314 is mapped to track 4. The tracks are filled consecutively (e.g., in the order track 1, track 2, track 3, track 4), and "channel 1" is (as described above) identified as the benchmark channel segment.

The channel 1 segment of track 2 is a continuation of the channel 1 segment of track 1, and the determined minimum sector offset is four sectors. Yet, the channel 1 segment of track 2 is offset from the channel 1 segment of track 1 by five sectors—one sector more than the determined minimum sector offset. As a consequence of this mapping, each channel segment in the mapping is offset from the corresponding continuous channel segment(s) by five sectors. In some implementations, such as the example mapping 306, it may advantageous to offset pairs of continuous channel segments by a spacing greater than the determined minimum sector offset (e.g., as shown). For instance, the particular offset selection of the mapping 306 reduces a number of annotations that are tracked in an LBA log file (e.g., the log file 228 of FIG. 2C) since the resulting mapping does not include any individual segments that span both of the sectors Z and A. For example, a segment wrapping around the portion of the track spanning sectors Z and A may be associated with two different LBA ranges captured in the log file, such as a consecutive LBA range of a of sectors Y-Z and the consecutive LBAs of sectors A-D (e.g., as in the mapping 302 along track 2). In contrast, the mapping scheme 306 does not include any channel segments spanning both of sector indices Z and A and the processing and memory associated with logfile maintenance is therefore somewhat reduced as compared to the mapping schemes 302 and 304, as each channel segment can be logged in association with just one LBA range.

Notably, the mapping 306 illustrates a scenario where there does exist a small rotational latency (e.g., a single-sector rotational latency) that is observed when reading each pair of continuous channel segments. For example, sectors A-F of track 1 are read; the read/write element is moved to track 2 in a time spanning 4 sectors of rotation. Here, the read/write element waits for the additional rotation of one sector before beginning to read the continuation channel segment spanning sectors N-T of track 2. Thus, the mapping scheme 306 corresponds to slightly higher processing latencies than the mapping schemes 302 and 304.

Figure 4:
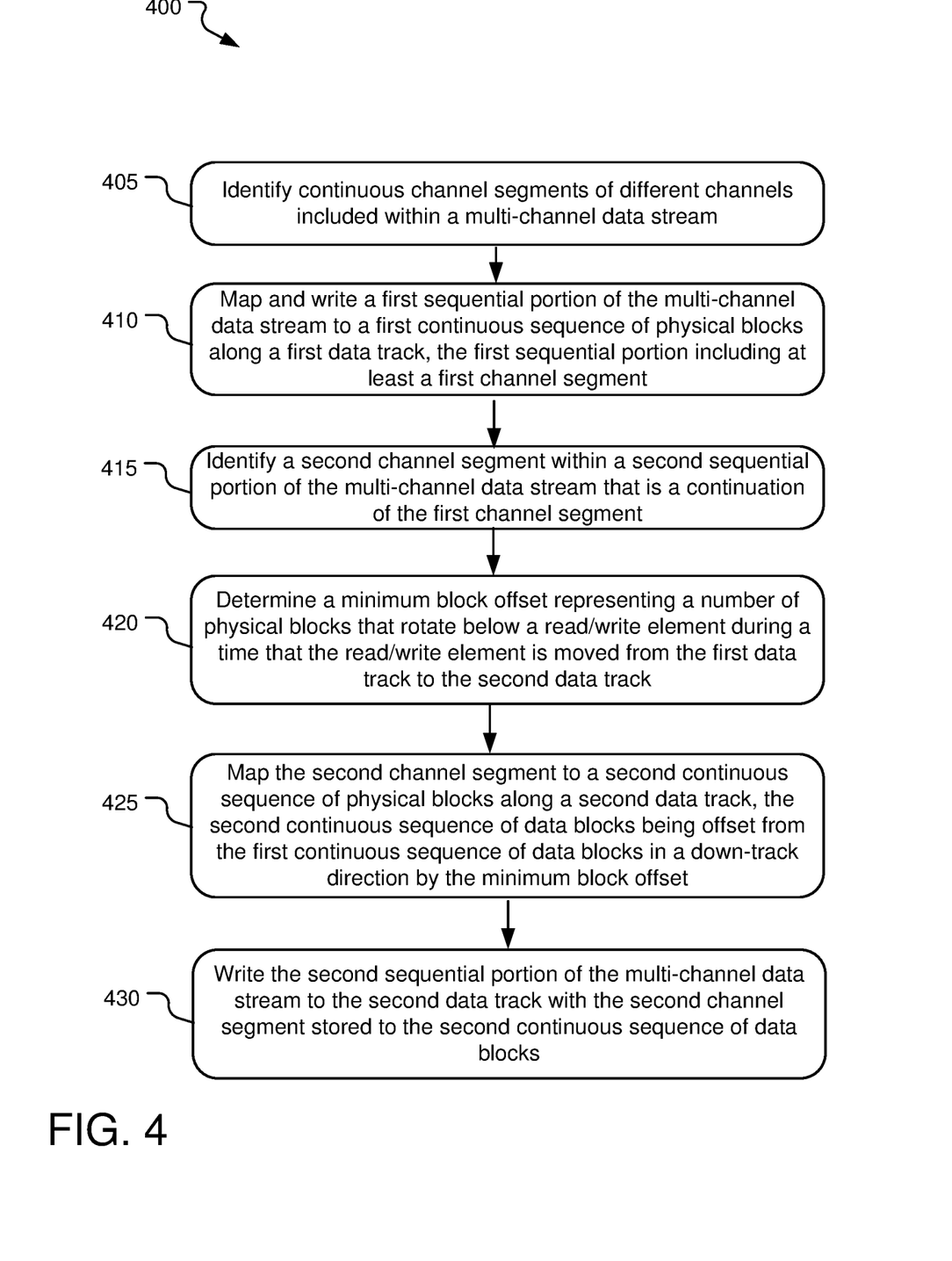
FIG. 4 illustrates example storage operations for accelerating read throughput of single-channel data received as part of a multi-channel data stream.

FIG. 4 illustrates example operations 400 for accelerating read throughput of single-channel data received at a storage device as part of a multi-channel data stream. A first identification operation 405 identifies contiguous channel segments of different channel included within a multi-channel data stream. The identification of the different channel segments can be achieved in a variety of different ways, including without limitation those examples discussed with respect to FIG. 1, above.

A mapping and writing operation 410 maps and writes a first sequential portion of the multi-channel data stream to a first continuous sequence of physical blocks along a first data track. The first sequential portion includes at least a first channel segment. An identification operation 415 identifies a second channel segment within a second sequential portion of the multi-channel data stream that is a continuation of the first channel segment. A determining operation 420 determines a minimum block offset (e.g., a sector offset) representing a number of physical blocks on a storage medium that rotate below a read/write element of the storage device during a time that the storage device repositions the read/write element from a position for reading data from the first data track to a position for reading data from the second data track.

Another mapping operation 425 maps the second channel segment to a second continuous sequence of physical blocks along a second data track, the second continuous sequence of data blocks being offset from the first continuous sequence of data blocks in a down-track direction by at least the minimum block offset.

A writing operation 430 writes the second sequential portion of the multi-channel data stream to the second data track with the second channel segment stored in accord with the mapping of the mapping operation 425.

The embodiments of the disclosed technology described herein are implemented as logical steps in one or more computer systems. The logical operations of the presently disclosed technology are implemented (1) as a sequence of processor-implemented steps executing in one or more computer systems and (2) as interconnected machine or circuit modules within one or more computer systems. The implementation is a matter of choice, dependent on the performance requirements of the computer system implementing the disclosed technology. Accordingly, the logical operations making up the embodiments of the disclosed technology described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A method comprising:
   writing a first channel segment of a multi-channel data stream to a first continuous sequence of physical blocks along a first data track of a storage medium within a storage device; identifying a second channel segment of the multi-channel data stream as being a continuation of the first channel segment; and
   responsive to the identification, writing the second channel segment to a second continuous sequence of physical blocks along a second data track, the second continuous sequence of physical blocks being offset from the first continuous sequence in a down-track direction by a minimum block offset, the minimum block offset representing at least a number of physical blocks on the storage medium that rotate below a read/write element of the storage device during a time that the read/write element is moved from the first data track to the second data track.

2. The method of claim 1, wherein the first channel segment and the second channel segment are non-contiguous within the multi-channel data stream.

3. The method of claim 1, further comprising:
identifying a channel identifier associated with each of a plurality of data segments included within a multi-channel data stream, the first channel segment and the segment channel segment corresponding to a same channel identifier.

4. The method of claim 1, wherein the multi-channel data stream includes at least one intervening channel segment between the first channel segment and the second channel segment, the intervening channel segment including data of a different channel than the first channel segment and the second channel segment.

5. The method of claim 1, further comprising:
writing the first channel segment and the second channel segment according to a sequential order of receipt of corresponding data within the multi-channel data stream.

6. The method of claim 1, wherein the first channel segment is included in a first sequential portion of the multi-channel data stream and the second channel segment is included in a second sequential portion of the multi-channel data stream and the method further comprises writing the second sequential portion to the second data track in a non-sequential order.

7. The method of claim 1, further comprising:
accessing a mapping table to determine a physical block index for a last-written data block of the first channel segment; and
dynamically mapping a start index of the second channel segment to a target physical block index on the second data track, the target physical block index being offset from the physical block index for the last-written data block of the first channel segment by at least the minimum block offset.

8. A system comprising:
a processor;
memory;
a dynamic LBA mapper stored in the memory and executable by the processor to:
map a first channel segment of a multi-channel data stream to a first continuous sequence of physical blocks along a first data track of a storage medium within a storage device;
identify a second channel segment of the multi-channel data stream as being a continuation of the first channel segment; and
responsive to the identification, map the second channel segment to a second continuous sequence of physical blocks along a second data track, the second continuous sequence of physical blocks being offset from the first continuous sequence in a down-track direction by a minimum block offset, the minimum block offset representing at least a number of physical blocks on the storage medium that rotate below a read/write element of the storage device during a time that the read/write element is moved from the first data track to the second data track.

9. The system of claim 8, wherein the first channel segment and the second channel segment are non-contiguous within the multi-channel data stream.

10. The system of claim 8, wherein the dynamic LBA mapper is further executable to:
identify a channel identifier associated with each of a plurality of data segments included within a multi-channel data stream, the first channel segment and the segment channel segment corresponding to a same channel identifier.

11. The system of claim 8, wherein the multi-channel data stream includes at least one intervening channel segment between the first channel segment and the second channel segment, the at least one intervening channel segment including data of a different channel than the first channel segment and the second channel segment.

12. The system of claim 8, wherein the dynamic LBA mapper is further executable to:
write the first channel segment and the second channel segment according to a sequential order of receipt of corresponding data within the multi-channel data stream.

13. The system of claim 8, wherein the first channel segment is included in a first sequential portion of the multi-channel data stream and the second channel segment is included in a second sequential portion of the multi-channel data stream and the dynamic LBA mapper is further executable to write the second sequential portion in a non-sequential order.

14. The system of claim 8, wherein the dynamic LBA mapper is further executable to:
access a mapping table to determine a physical block index for a last-written data block of the first channel segment; and
dynamically map a start index of the second channel segment to a target physical block index on the second data track, the target physical block index being offset from the physical block index for the last-written data block of the first channel segment by at least the minimum block offset.

15. One or more non-transitory computer-readable storage media encoding computer-executable instructions for executing on a computer system a computer process, the computer process comprising:
writing a first channel segment of a multi-channel data stream to a first continuous sequence of physical blocks along a first data track of a storage medium within a storage device; identifying a second channel segment of the multi-channel data stream as being a continuation of the first channel segment; and
responsive to the identification, writing the second channel segment to a second continuous sequence of physical blocks along a second data track, the second continuous sequence of physical blocks being offset from the first continuous sequence in a down-track direction by a minimum block offset, the minimum block offset representing at least a number of physical blocks on the storage medium that rotate below a read/write element of the storage device during a time that the read/write element is moved from the first data track to the second data track.

16. The one or more non-transitory computer-readable storage media of claim 15, wherein the first channel segment and the second channel segment are non-contiguous within the multi-channel data stream.

17. The one or more non-transitory computer-readable storage media of claim 15, wherein the computer process further comprises:
  identifying a channel identifier associated with each of a plurality of data segments included within a multi-channel data stream, the first channel segment and the segment channel segment corresponding to a same channel identifier.

18. The one or more non-transitory computer-readable storage media of claim 15, wherein the multi-channel data stream includes at least one intervening channel segment between the first channel segment and the second channel segment, the at least one intervening channel segment including data of a different channel than the first channel segment and the second channel segment.

19. The one or more non-transitory computer-readable storage media of claim 15, wherein the computer process further comprises:
  writing the first channel segment and the second channel segment according to a sequential order of receipt of corresponding data within the multi-channel data stream.

20. The one or more non-transitory computer-readable storage media of claim 15, wherein the first channel segment is included in a first sequential portion of the multi-channel data stream and the second channel segment is included in a second sequential portion of the multi-channel data stream and the computer process further comprises writing the second sequential portion to the second data track to in a non-sequential order.

* * * * *